Figure 1:
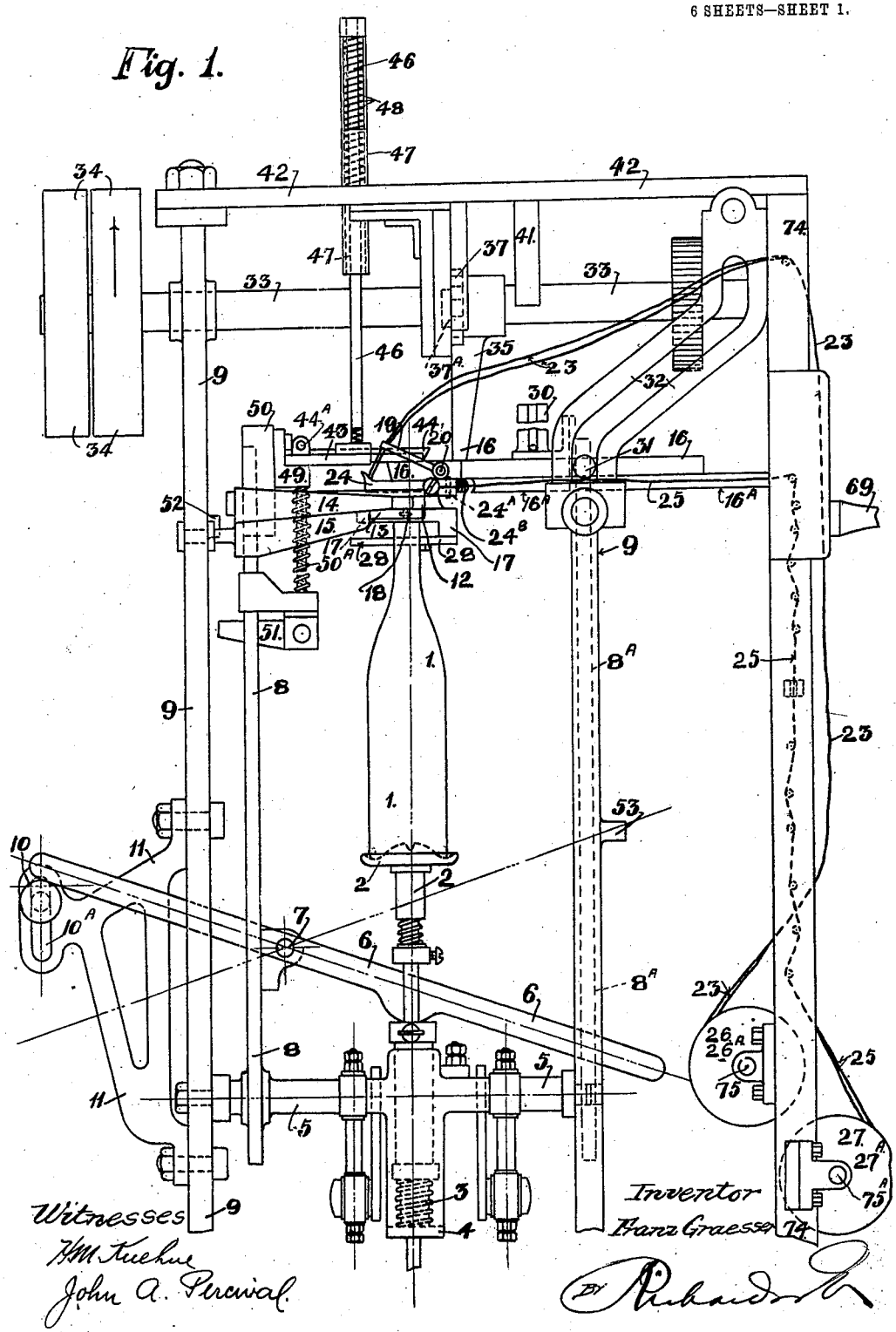

No. 861,971. PATENTED JULY 30, 1907.

F. GRAESSER.

MACHINE FOR WIRING CORKED BOTTLES.

APPLICATION FILED SEPT. 22, 1904.

6 SHEETS—SHEET 1.

Witnesses
H. M. Kuehne
John A. Percival

Inventor
Franz Graesser
By Richardson
Attorneys

No. 861,971. PATENTED JULY 30, 1907.
F. GRAESSER.
MACHINE FOR WIRING CORKED BOTTLES.
APPLICATION FILED SEPT. 22, 1904.

6 SHEETS—SHEET 2.

Witnesses
Inventor
Franz Graesser

No. 861,971. PATENTED JULY 30, 1907.
F. GRAESSER.
MACHINE FOR WIRING CORKED BOTTLES.
APPLICATION FILED SEPT. 22, 1904.
6 SHEETS—SHEET 3.
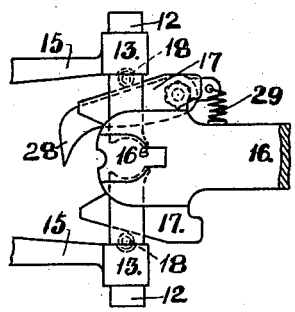
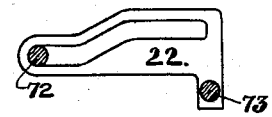
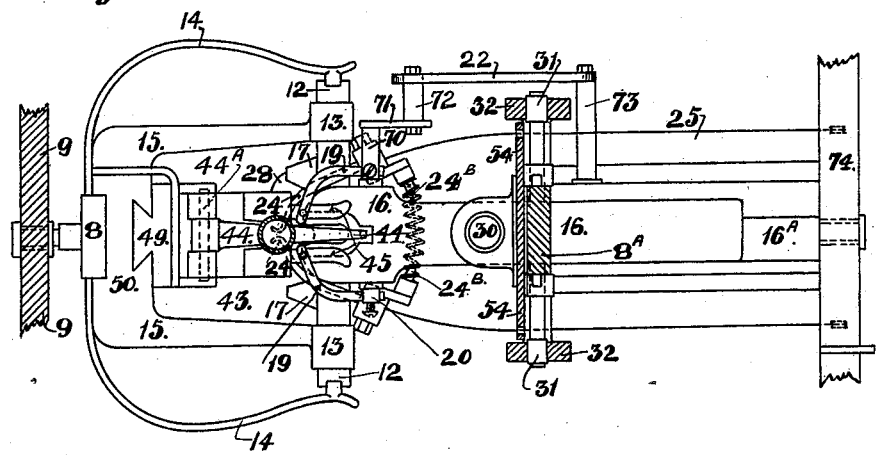
Inventor
Franz Graesser No. 861,971. PATENTED JULY 30, 1907.
F. GRAESSER.
MACHINE FOR WIRING CORKED BOTTLES.
APPLICATION FILED SEPT. 22, 1904.
6 SHEETS—SHEET 4.

Fig. 5ᴬ.

Witnesses
Inventor
Franz Graesser

No. 861,971. PATENTED JULY 30, 1907.
F. GRAESSER.
MACHINE FOR WIRING CORKED BOTTLES.
APPLICATION FILED SEPT. 22, 1904.
6 SHEETS—SHEET 5.
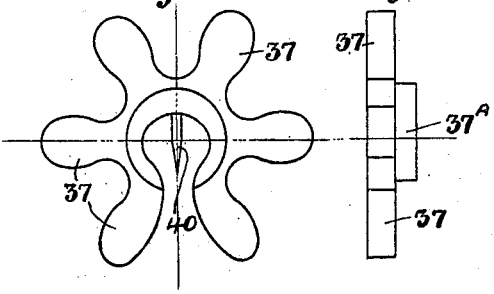
Fig. 6. Fig. 6.A
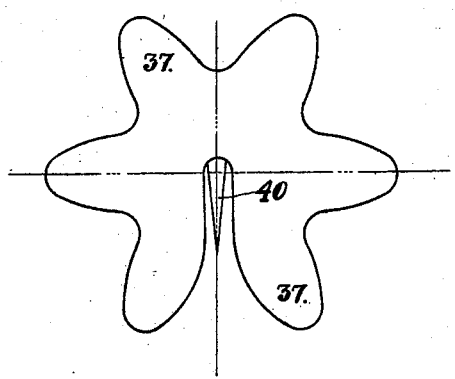
Fig. 7.
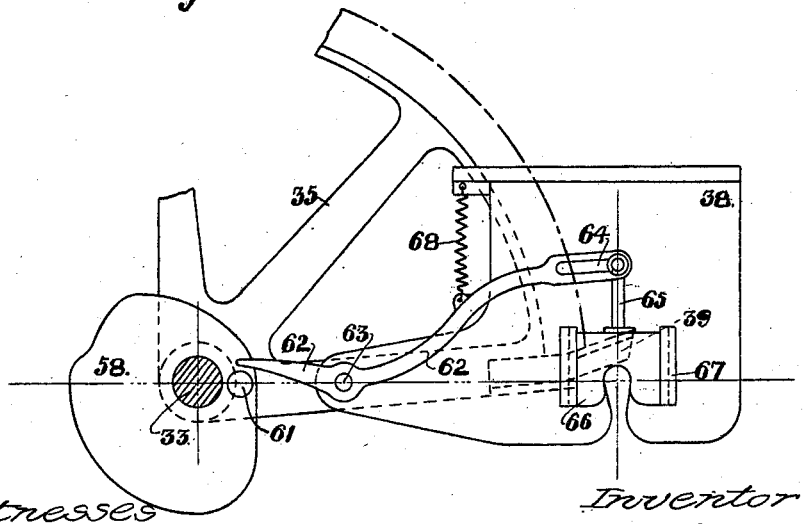
Fig. 8.
Witnesses
H. M. Kuehne
John A. Percival
Inventor
Franz Graesser
By Richardson
Attorneys

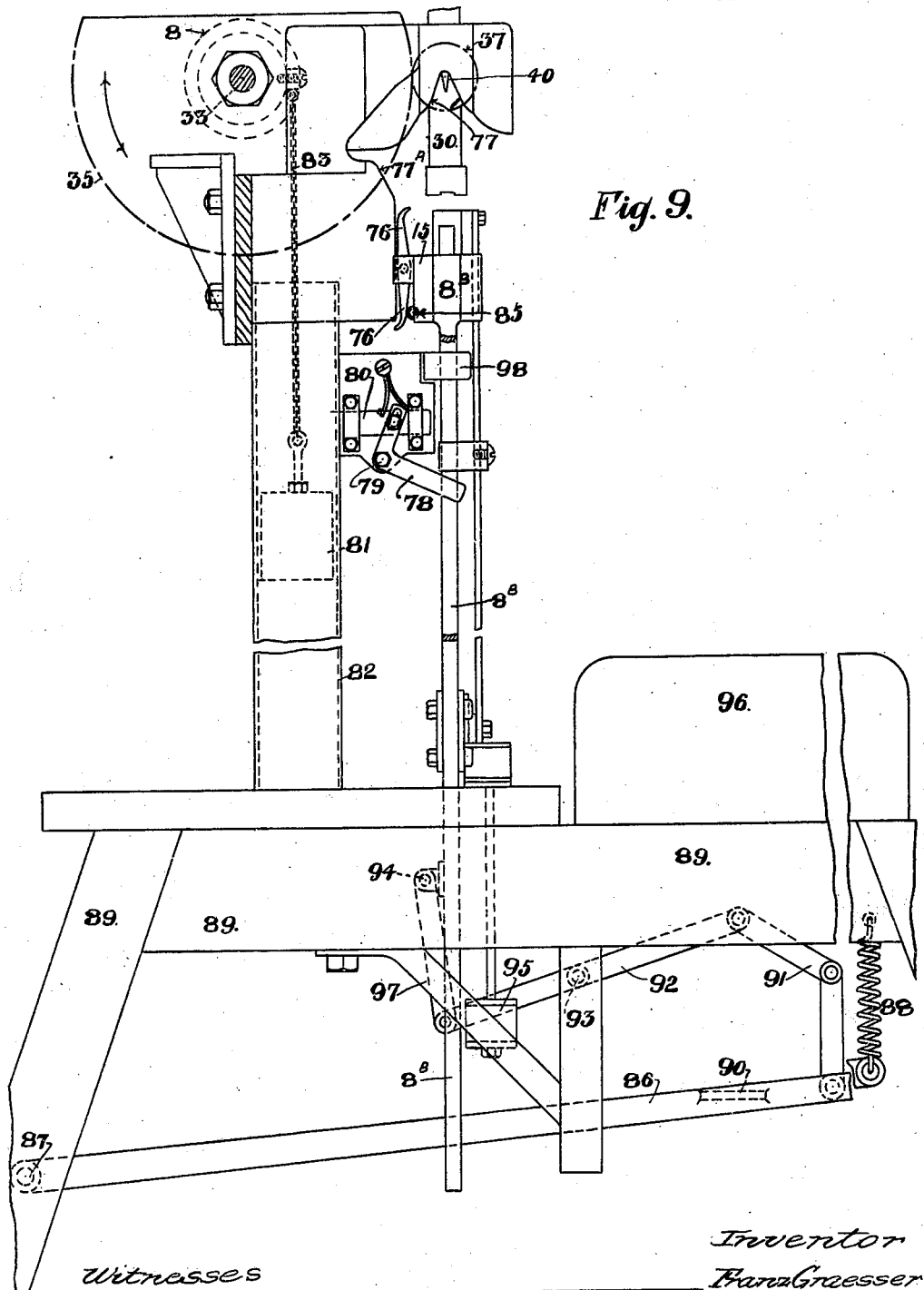

UNITED STATES PATENT OFFICE.

FRANZ GRAESSER, OF HOYLAKE, ENGLAND, ASSIGNOR TO ROBERT HARLEY, OF LIVERPOOL, COUNTY OF LANCASTER, ENGLAND.

MACHINE FOR WIRING CORKED BOTTLES.

No. 861,971.  Specification of Letters Patent.  Patented July 30, 1907.

Application filed September 22, 1904. Serial No. 225,455.

*To all whom it may concern:*

Be it known that I, FRANZ GRAESSER, a subject of the King of England, and a resident of 31 Cable road, Hoylake, in the county of Chester, England, have invented certain new and useful Improvements in Machines for Wiring Corked Bottles, of which the following is a specification.

This invention has for its object a machine for wiring corked bottles, and which will take almost any sized bottle.

It consists of a framework at which the operator sits or stands, a machine in front consisting of a frame carrying an axle; a rising and falling spring clip for holding the bottle head; a reciprocating device or wire guide acting also for placing a wooden disk on the top of the cork prior to wiring; devices for pressing the free wires down to level with the bottle neck; a device for twisting the wire with multiple twist and central loop after the bottle has been placed in position; a device for cutting the twist near the loop; a device in the case of a hand and treadle machine, for holding the twisting mechanism until the bottle and wire guide have been lowered out of position; a friction device for placing a heavy strain on the bottom wires, and a lighter strain on the top wires; a fast and loose pulley and cam on the main shaft in the case of power machines, or a treadle and hand crank in the case of hand machines; a spring mushroom adjustable bottle rest and trippers, for lifting and lowering the bottle automatically; a device for throwing the bottle out of the clip; a wood top follower and guide for top wires carrying the central spring clip or hook which brings the wood top on to the bottle and holds it there as the wire guide withdraws, and which follower and guide are actuated either by a rising table for a short distance, and then by the bottle, or, by a spring, and then by the bottle. There are also fingers or claws on the follower which hold the wood top and top wires in position. A ratchet and pawl prevents the main shaft going the wrong way.

The several sets of mechanism, which together constitute a machine, constructed according to this invention are classified, for the sake of clearness, as follows;—1. Mechanism for manipulating the bottle. 2. Wiring mechanism. 3. Wood top supplying and manipulating mechanism.

The first of these sets comprises:—(*a*) Mechanism for raising the bottle to a suitable position for wiring. (*b*) Mechanism for supporting the bottle during wiring. (*c*) Mechanism for delivering the bottle after wiring.

The second set comprises:—(*a*) A tension regulating device. (*b*) Mechanism for guiding some of the wires round the neck of the bottle. (*c*) Mechanism for guiding some of the wires over the top of the bottle. (*d*) Mechanism for twisting, looping, and cutting the wires. (*e*) Mechanism for pressing the projecting ends and loop of wire against the neck of the bottle, after the wiring has been completed.

The third set comprises:—(*a*) A tube or container for wood tops. (*b*) Mechanism for holding a wood top on the bottle. (*c*) A device for carrying a wood top from the container to the bottle.

Drawings illustrating my invention are annexed hereto, in which:—

Figure 2:
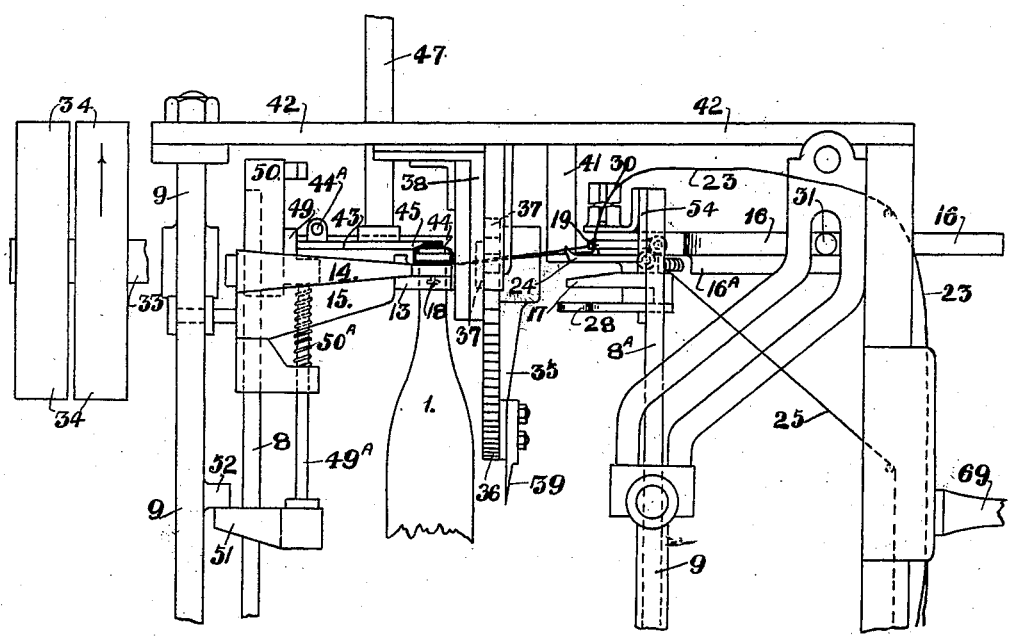
Figure 5:
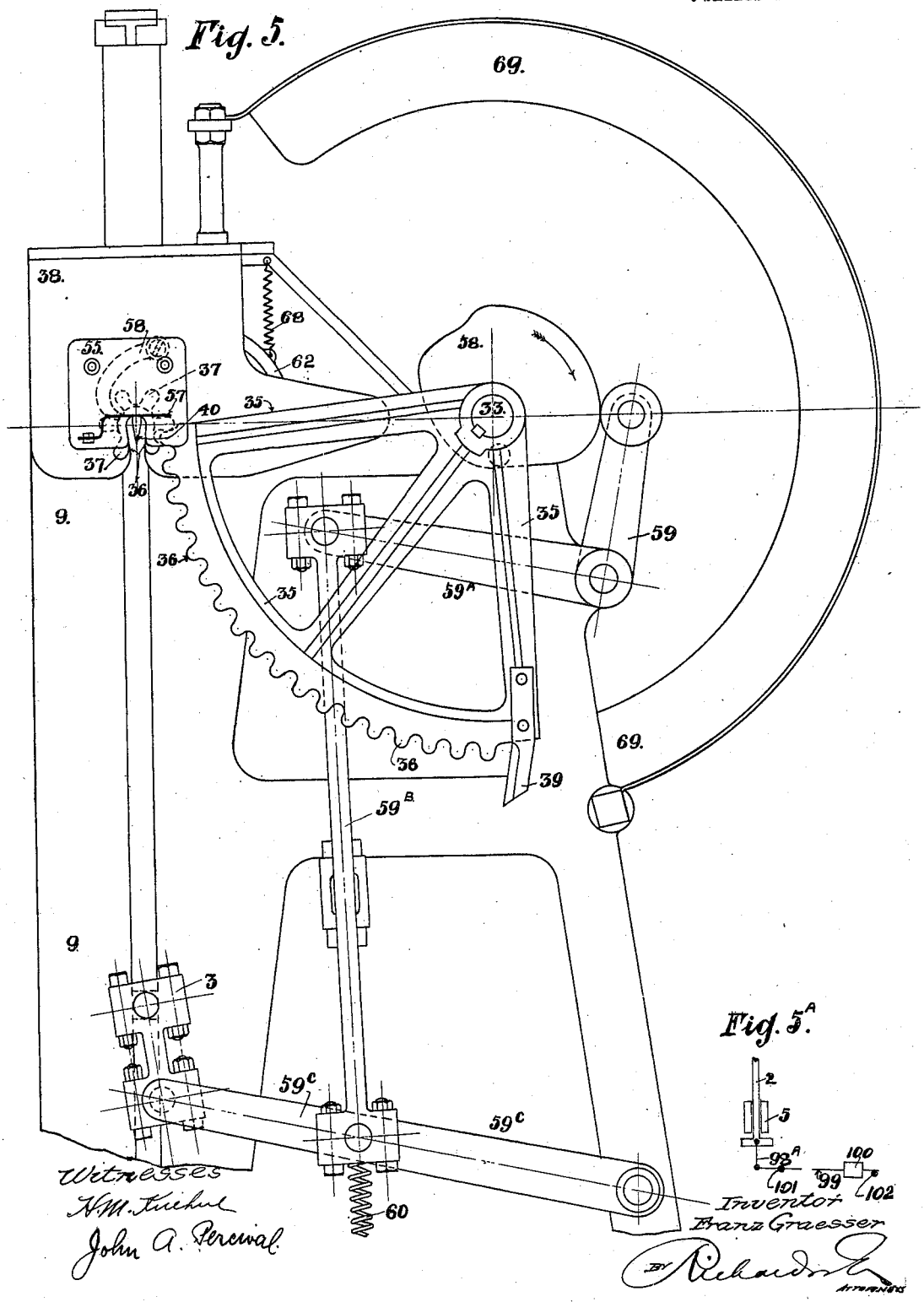

Figure 1 represents generally, in front elevation, a bottle wiring machine, showing a bottle in its lowermost position, ready for wiring; while Fig. 2 shows the bottle in its uppermost position, and prior to the wires being twisted and cut. Fig. 3 is a plan view of the wire guide and wood top follower; and parts connected therewith. Figs. 4, and 4$^A$ are details relating to Fig. 3. Fig. 4$^B$ is a plan view, drawn to an enlarged scale, of parts of the mechanism for clipping and supporting the bottle during wiring. Fig. 5 illustrates, generally, in side elevation, the looping, twisting, and cutting mechanism; and also mechanism for raising and lowering the bottle. Fig. 5$^A$ shows diagrammatically a modified means of actuating the bottle. Figs. 6 and 6$^A$ are front and side views, respectively, of the twisting pinion, as shown in Fig. 5, drawn to an enlarged scale. Fig. 7 shows a modified shape of twisting pinion. Fig. 8 represents, in side elevation, mechanism for pressing the projecting ends and loop of wire against the neck of the bottle, after the wiring has been completed. Fig. 9 shows, in side elevation, parts of a hand and treadle machine, according to my invention.

In the drawings, like figures of reference denote like or similar parts wherever they occur.

Referring now to the drawings, and, more particularly to Figs. 1 to 8:—1. (Fig. 1) represents the bottle to be wired, which is placed upon the spring actuated adjustable support or rest 2. The rest 2 is maintained in its lowermost position, and against the resistance of a spring 3 disposed within a socket 4 in the crosshead 5, by means of the tripping lever 6, fulcrumed at 7 upon the slide or distance piece 8. In its downward motion, one end of lever 6 engages with a stop 10, adjustable in the slot 10$^A$ provided in the bracket 11; which is bolted to the frame 9.

The bottle rest 2 is so adjusted that when a bottle 1 is placed upon it, its head is between or immediately below clips 12 which slide in grooves in the bottle holder bracket 15, being held in position by a plate 13; and said clips grip the bottle neck 1$^A$ (Fig. 4$^B$) during the wiring operation through springs 14 secured to the bottle holder or clip supporting bracket 15, which latter is, in turn, carried by the slide or distance piece 8.

In a modification, the clip supports 13 (Fig. 4ᴮ) may be provided with springs 13ᴬ, and cut-away parts 13ᴮ, to permit of lateral "play" of the clips. 13ᶜ being recesses provided, so that in cases of double wiring they receive the twisted ends of the wires already on the bottle neck.

In some cases, the clip actuating springs may be disposed above the clips in Λ formation, in order to increase their pressure as the bottle neck rises to its top position.

What I term the "wire guide" is generally designated 16, and moves in a dovetailed recess provided in its support 16ᴬ, which is firmly secured to the slide or distance piece 8ᴬ. The wire guide head 16, has pivoted to it at 20 on either side a radial rod 19 with an eye at the end, through which one of the top wires 23 passes. The rods 19 are connected, through arms 70, 71, 72, (Figs. 3 and 4ᴬ) with a small roller path 22 secured by arm 73 to the wire guide support 16ᴬ. Below the rods 19, referred to, is disposed, on each side of the wire guide head 16, a radial acting tube which carries one of the bottom wires 25. The tubes are fulcrumed to the head 16 on either side as at 24ᴬ, and are connected with each other by a spring 24ᴮ, which passes under the wire guide 16. The two upper wires 23 are led from reels or bobbins 26, 26ᴬ, mounted on the spindle 75, which is supported by the outer frame 74; while the two lower wires 25 are led from the reels 27, 27ᴬ, mounted on the spindle 75ᴬ. The lower part of the wire guide head 16 on either side is wedge shaped, the wedges 17 being adapted to engage with rollers 18 carried by the clips 12, and so open the clips against the resistance of springs 14. A finger 28 is pivoted to one side of the wire guide head 16 below the wedges 17, and is connected to the other side by a spring (see Fig. 4) 29. This finger 28 is adapted to push the bottle 1 free from the clips 12 after wiring.

30 designates the wood top storage tube, which may be of any suitable length, for the purpose of holding a supply of wood tops or disks.

On either side of the wire guide 16 rollers 31 are mounted, and move in the roller paths 32; the latter being firmly secured to the frame of the machine.

The driving axle 33 carries a segment 35, provided with teeth 36, and which is adapted to gear with the twisting pinion 37, suitably supported in a casing 38 from the upper part 42 of the frame. The casing 38 has a part cut away co-incident with the hiatus in pinion 37. The twisting pinion 37, as shown clearly in Figs. 6 to 7, has a part cut out up to the center, and has a central pin 40 pointing down into the hiatus. The four wires 23, 25, when the bottle is in its highest position pass through the hiatus on each side of the pin. The segmental wheel 35, and pinion 37 being rotated, the pinion 37 twists the wires three or four times round thus forming a double twist, that is, one twist on each side of the pin 40, and a loop between the twists where the pin 40 goes through. A pawl 58 engaging with the twisting pinion 37 holds the pinion in the true position at the end of the stroke for the wires 23, 25, to enter the hiatus.

39 represents a cutting knife provided on the segment 35, which, when the wheel and pinion have arrived at or nearly the last cog, comes into action, passing a stationary knife 55 with a deeply corrugated flat edge 56 (which knife also helps to keep the pinion 37 in position), and shears the wires just beyond the loop. A flat metal spring 57 serves to force the twisted wires downwards after being severed, the wires having been slightly elevated in the action of cutting.

The twisting pinion 37 is provided with a collar 37ᴬ, which fits and rotates in a suitable bearing provided for it in the casing 38.

34 indicate fast and loose pulleys mounted on shaft 33, a suitable fork or other device being employed for throwing the belt on to the loose pulley, when one revolution of the main shaft is made. Or, in connection with the driving mechanism, I may provide a clutch, by which the starting and stopping of the machine may be effected.

Power for driving the machine may be applied directly on to the main shaft, as shown, or through suitable gearing.

41 represents a stationary central wedge, secured to 42, which wedge enters between and insures the opening of the bottom wire carrying tubes 24, (see Fig. 2), for the purpose of regulating the length of twist of the wires.

43 represents the wood top follower and guide for the top wires 23, 44 being a central spring claw or hook pivoted at 44ᴬ, and which holds the wood top in position above the bottle while the wire guide is being withdrawn.

45 are claws or fingers on the underside of the follower 43, which hold the wood top and top wires 23 in position.

A rod 46 disposed in a stationary sleeve or casing 47, rests upon and adds weight to the follower 43; and to further increase the pressure on same, I provide at the upper part of the rod, a spring 48.

The wood top follower 43 rests, when the parts are in their lowermost positions upon the table or platform 49, which slides in the dovetailed recess in socket 50 carried by the distance piece or slide 8. The table 49 is connected by means of a rod 50ᴬ, (having a spring disposed upon it) with a projection 51, which engages with a stop 52 upon the frame 9 in its upward travel.

53 is a stop upon the frame 9, with which the lever 6 engages in its upward travel.

The device I employ, whereby a heavy strain is placed on the bottom wires, comprises a plate 54, secured to the slide or distance piece 8ᴬ, and having holes in it on either side, through which the bottom wires 25 pass. As the plate 54 rises, and the wires are drawn from the reels 27, 27ᴬ, tension is placed upon them by reason of the friction between them and the spindles or bars 25ᴬ, in and out of which the wires are threaded. The top wires are subjected to less friction, as they are passed in and out of fewer bars.

The actuation of the bottle rest and bottle, and parts hereafter referred to is effected by a cam 58, carried on the main shaft 33, which cam engages with the bell crank lever 59, 59ᴬ, and so, through 59ᴮ, and 59ᶜ, actuates the crosshead 5, to which the bottle rest 2 is connected. A spring 60 may be employed to assist the downward motion of these parts. A roller 61 is provided on the cam 58, which engages with a lever 62, fulcrumed at 63 to the casing 38. This lever 62 is connected with a slide 66 movable in guides 67 on 38, through rod 65 working in slot 64 in said lever. A spring 68 normally keeps the slide in its top position. 69 represents a guard for the segment 35.

Referring now to Fig. 9 of the drawings, which shows in side view parts of a hand and treadle machine, according to my invention, and in which the toothed segment 35 does not make a complete revolution, as in the power machine, hereinbefore described, 76 represents a tumbling finger, fulcrumed to the bottle holder 15, and is adapted to be guided round by the contour of the cam shaped part 77. 81 is a weight disposed within the casing 82, and connected by a chain with pulley 84, carried on the driving axle 33, which is rotated by means of a suitable crank handle. A catch 80 is connected with a bell crank lever 78 fulcrumed at 79, and projects through a slot into the casing 82, a projection 98 on $8^B$ engages with the lever 78 in its downward travel. 85 indicates a spring catch or bolt carried by the bracket 15 for the purpose of insuring the tumbling finger 76 always rotating in the desired direction, i. e. clockwise. The slides or distance pieces are actuated, in this case, by pressure of the foot upon the foot plate 90, supported on the lever 86, one end of which is pivoted at 87 to 89, the other end being connected to the bench by a spring 88, if desired, and so, through links 91, lever 92 fulcrumed at 93, link 97 attached at 94 to the slide or distance piece $8^B$, when lever 86 is pressed downwards by the user sitting astride the seat 96, the slides are raised; and are lowered on the pressure being removed. 95 indicates a stop for the purpose of limiting the upward travel of slides $8^B$.

I will now describe the operations of wiring a bottle, more particularly with reference to the machine as described and illustrated in Figs. 1 to 8.

Assuming the parts of the machine to be in the position as shown in Fig. 1, the bottle 1 is placed upon the bottle rest or support 2, with its neck $1^A$ between or immediately below the clips 12, which have been previously automatically opened by the wedge pieces 17 on wire guide head 16 coming between the rollers 18 on same. In this position of the bottle the tripping lever 6 has engaged with stop 10, and thereby lowered the bottle rest 2 against the resistance of spring 3. Upon rotation of the driving axle 33, the cam 58 on same, through the link and lever gear as before referred to, causes the crosshead 5 to rise. As said crosshead 5 rises, the lever 6, being connected to the slide or distance piece 8, also rises, and the spring 3 lifts the bottle head above the clip and bottom wire carrying tubes and against the underside of the wire guide head 16, and immediately below a wood top, which is lying in the embayment $16^B$ provided for it in the wire guide head. In this position, the flange of the bottle is above tubes 24 carrying the bottom wires, so as to insure wires 25 being below the bottle flange upon the withdrawal of the wire guide 16.

In the modified means of actuating the bottle, as shown diagrammatically in Fig. $5^A$, the adjustable bottle rest 2 is linked by links $98^A$ to a lever 99 fulcrumed at 101 and having weight 100 which lever is tripped by stop 102 in its downward travel, the pressure of the wood top follower 43 being sufficient to press the bottle downwards until its flange rests upon the clips after the wire guide is withdrawn. The fulcrum 101, being supported from crosshead 5, the bottle rest has always a tendency to move upwards. As the slides or distance pieces 8, $8^A$ rise the following parts are raised by them. Slide 8;—Clip supporting bracket 15 carrying clips 12 and springs 14, socket 50, table 49 and projection 51; and wood top follower 43. Slide $8^A$;—Wire guide 16, to the head of which is connected (a) radial rods 19 carrying top wires, (b) radial tubes 24 carrying bottom wires, (c) wedge pieces 17, (d) spring finger 28. Wire guide support $16^A$. Wood top container 30. Bottom wire tension plate 54. Small roller path 22, (Fig. $4^A$). As the movement upwards continues, the wire guide head 16 is withdrawn (by reason of the rollers 31 moving in their stationary roller paths 32), to the other side of the cutting and twisting mechanism, without coming into contact with the latter, and leaving the wood disk on the bottle, which disk has been restrained from movement laterally by the spring claw or hook 44 and claws or fingers 45, and at or about this time the upward motion of the temporary support or table 49 is arrested, by reason of the projections 51 engaging with stop 52, whereupon the follower 43 rests solely upon the wood top (or if a wood top is not being used it rests upon the bottle or cork itself), and holds it firmly in position on the cork, and at the same time the claws 45 keep the top wires in position. As the wire guide is withdrawn, the clips 12 close upon the bottle neck. Shortly after the table 49 has ceased to support the follower 43, lever 6 engages with stop 53, whereupon the bottle rest 2 is depressed somewhat, allowing the bottle to move downwards by reason of its weight and the increasing pressure of the wood top follower 43 upon it by the compression spring 48, until its flange meets the clip 12 in its upward travel, by which it is carried into position in line with, or just above the center of twisting spindle 37 (see Fig. 2), thus insuring the wires being twisted together directly under the flange of the bottle, notwithstanding variations in sizes and shapes of bottle heads, or in the manner in which the corks have been driven into the bottles; or, within certain limits, of the lengths of the bottles themselves. As the wire guide head 16 is withdrawn, the radial rods 19, with eyes for the top wires, are actuated through the small roller path 22, the ends moving downwards, as shown in Fig. 2, so depressing the top wires 23 over the head of the bottle into position for twisting. At the same time the radial tubes 24, carrying the bottom wire eyes, and actuated by spring $24^B$, and bottle, open outwards and press the bottom wires round the neck of the bottle, and, as the bottle and wire guide rise, they bring these wires into the twisting mechanism, that is, all four wires are brought together, two (one upper and one lower) on either side of the pin 40 of the twisting pinion 37, and at or about the center of the pinion. The toothed segment 35 on the main shaft 33 now gears with the pinion 37 and rotates it, so twisting the wires, the wedge piece 41 permitting the twist to run up the wires, and regulating the length of same. The twisted wires are now sheared by the knife 39, near the loop formed by the pin 40, so leaving the four ends of the wires in the wire guide twisted, ready for the next bottle.

During the operations of twisting and cutting, the reciprocating wire guide is at the limit of its outward travel, and the embayment 16^A provided in it has moved under the wood top storage tube 30, and has received a wood top. The cam 58 now permits the slides or distance pieces 8, 8^A, and parts operating in conjunction with them, as before described, to be lowered; and when the loop on the wired bottle is lowered clear of pin 40 a pause in the cam arrests the downward travel, and roller 61, coming into contact with lever 62, moves the slide 66 downwards, and presses the twisted wires with loop against the side of the bottle neck. As the bottle continues to descend, the spring finger 28 on the wire guide 16 pushes its head out of the clip, and against the inner side of the bottle holder 15, which is lined with rubber, felt, or other suitable material to prevent breakage of the bottle. In the meantime, the wood top has moved under the hook 44 and claws 45, and the machine is now ready for another bottle.

Referring now to the hand and treadle machine, as illustrated in Fig. 9, the operator places a bottle upon the bottle rest, and, by pressing upon the foot plate or treadle 90, moves the bottle and slides 8^B which carry or actuate the parts as before described, up to the twisting mechanism. In its upward travel, the then upper end of the tumbling finger 76 comes into contact with the cam shaped groove 77, and is inclined forward by the contour of same; then (after twisting and cutting) as the bottle holder moves downwards, the other end of the finger comes into contact with part 77^A, thereby completing its revolution, and in so doing engages with the twisted wires and loop, and presses them against the neck of the bottle. The handle connected with shaft 33 is then moved by the operator through its arc, whereby the operations of twisting and cutting are effected, in the manner as hereinbefore described. At the same time the counter weight 81 connected with pulley 84 by chain 83 is raised above the catch 80, and is supported by it, in order—when the handle is released—to prevent the return of the twisting mechanism (segment 35 being always in gear with pinion 37) until the wires have moved down, and are clear of the twisting pinion 37. Otherwise, the returning segment, rotating pinion 37 in the reverse direction, would untwist the wires on the bottle. In the continued downward movement, the projection on slide 8^B comes into contact with lever 78, and, withdrawing catch 80, allows the counterweight to fall, so bringing about the return of the segment at the desired time.

While the machines, as hereinbefore described, are designed more particularly for the use of four separate wires, any other suitable number of wires may be employed, if desired.

It is to be stated that I do not confine myself to the precise mechanical details as hereinbefore described, as these may obviously be modified without departing from the essential characteristics of my invention.

Having now described my invention, what I claim as new and desire to secure by Letters Patent is:—

1. In bottle wiring machines of the kind herein described, in combination, pinion 37, quadrant 35, movable knife 39, stationary knife 55, and spring 57; substantially as described.

2. In a bottle wiring machine operating in the manner herein specified, a device for twisting the wires on to the neck of the bottle with multiple twist and loop, comprising in combination, a pinion having a part cut out of same, and a central pin pointing down into the hiatus, said pinion being mounted on a stationary part of the frame of the machine; a stationary central wedge 41; and means for twisting the wires; substantially as described.

3. For use in a bottle wiring machine operating in the manner herein specified, mechanism for guiding the wires round the neck of the bottle, comprising in combination the wire guide 16, radial eye rods 19, radial tubes 24 connected by spring 24, wedges 17, and spring finger 28; and means for imparting movement to said wire guides, substantially as described.

4. For use in a bottle wiring machine operating in the manner herein specified, the means for holding a wood top temporarily upon the cork, comprising in combination with follower 43, spring claw 44, fingers 45, and means for weighting said follower, substantially as described.

5. For use in a bottle wiring machine operating in the manner herein specified, the means of guiding the wires upon and around the bottle and temporarily holding a wood top comprising in combination wire guide 16, radial eye rods 19 connected to wire guide 16, radial tubes 24 connected by spring 24, wedges 17, spring finger 28, follower 43 with spring claw 44, fingers 45, and means for weighting said follower, substantially as described.

6. For use in a bottle wiring machine operating in the manner herein specified, in combination, wire guide 16, radial eye rods 19 connected to said wire guide 16, radial tubes 24 connected by spring 24, wedges 17, spring finger 28, follower 43 provided with spring claw 44, fingers 45, means for weighting said follower, table 49 movable in socket 50, rod 50 projection 51, and a stop 52 on frame 9, substantially as described.

7. For use in a bottle wiring machine operating in the manner herein specified means for controlling the bottle during wiring operations comprising spring clips 12, carried by bracket 15 supported on frame 9, and wedges 17 on guide 16, adapted to force the clips back against the resistance of springs, substantially as described.

8. In a device of the class described, clip supports 13 having cut away portions 13, clips 12 having recesses 13^c therein and carried by said supports and springs 13 engaging with the clips.

9. In a bottle wiring machine, a wire guide 16 having a recess 16 therein, a reservoir 30 for delivering tops to said recess, means for reciprocating the guide 16 and a follower 43 for holding the top on the bottle.

10. In a bottle wiring machine, a bottle rest 2, springs for raising the rest, a movable cross head carrying the rest, a lever 6 and stops for engaging with the lever to lower the rest against one of the springs.

11. In a bottle wiring machine, means for pressing the twisted wire against the neck of the bottle, said means consisting of a vertically movable slide, a two arm lever 62 having a slot 64 at one end, a link 65 having one end pivoted in said slot and its other end connected to the side and means engaging with the other end of the lever for rocking the same.

In testimony whereof I have signed my name to this specification in the presence of two subscribing witnesses.

FRANZ GRAESSER.

Witnesses:
  JOHN H. WALKER,
  JOHN KERR.